(12) United States Patent
Hoshino et al.

(10) Patent No.: US 8,277,142 B2
(45) Date of Patent: Oct. 2, 2012

(54) SHAFT CONNECTION STRUCTURE

(75) Inventors: Shigeru Hoshino, Toyota (JP); Seiji Tanaka, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 184 days.

(21) Appl. No.: 12/676,515

(22) PCT Filed: Apr. 7, 2009

(86) PCT No.: PCT/JP2009/057423
§ 371 (c)(1),
(2), (4) Date: Mar. 4, 2010

(87) PCT Pub. No.: WO2010/116537
PCT Pub. Date: Oct. 14, 2010

(65) Prior Publication Data
US 2011/0129294 A1 Jun. 2, 2011

(51) Int. Cl.
*B25G 3/28* (2006.01)
(52) U.S. Cl. ........................................ 403/355; 403/315
(58) Field of Classification Search .......... 403/315–320, 403/355, 373, 379.3, 378; 464/134
See application file for complete search history.

(56) References Cited

U.S. PATENT DOCUMENTS

| | | | | |
|---|---|---|---|---|
| 2,448,278 A | * | 8/1948 | Ronning | 192/71 |
| 2,780,830 A | * | 2/1957 | Kammerer, Jr. | 16/381 |
| 3,070,390 A | * | 12/1962 | Schroter et al. | 403/354 |
| 3,608,936 A | * | 9/1971 | Karden | 403/9 |
| 3,796,464 A | * | 3/1974 | Hansen et al. | 299/104 |
| 4,372,703 A | * | 2/1983 | Szostak | 403/324 |
| 4,537,523 A | * | 8/1985 | Haldric | 403/12 |
| 4,628,758 A | * | 12/1986 | Yuzuriha et al. | 74/498 |

(Continued)

FOREIGN PATENT DOCUMENTS

JP 4 54325 5/1992

(Continued)

*Primary Examiner* — Michael P Ferguson
*Assistant Examiner* — Daniel Wiley
(74) *Attorney, Agent, or Firm* — Oblon, Spivak, McClelland, Maier & Neustadt, L.L.P.

(57) ABSTRACT

A tightened shaft portion 51*a* of a shaft 51 and a tightened portion 42*b* of a lower joint yoke 42 are coupled with each other such that a required torque can be transmitted therebetween by inserting the tightened shaft portion 51*a* of the shaft 51 into a shaft insertion hole 42*b*2 of the lower joint yoke (a coupling member) 42, and inserting a bolt 44 into a bolt insertion aperture 42*b*3 of the lower joint yoke 42 and a bolt engagement groove 51*a*1 of the shaft 51 and tightening the bolt in the condition (the regular position condition) that the bolt engagement groove 51*a*1 of the shaft 51 and the bolt insertion aperture 42*b*3 of the lower joint yoke 42 are axially aligned with each other. An insertion restriction portion 51*b* having a diameter smaller than that of the tightened shaft portion 51*a* is provided at the tip end of the tightened shaft portion 51*a* of the shaft 51 for restricting the insertion of the bolt 44 through the bolt insertion aperture 42*b*3 of the lower joint yoke 42 in the condition (the non-regular position condition) that the insertion restriction portion 51*b* axially overlaps the bolt insertion aperture 42*b*3 of the lower joint yoke 42 when the tightened shaft portion 51*a* is inserted into the shaft insertion hole 42*b*2 of the lower joint yoke 42, and the insertion restriction portion 51*b* can be rotated relative to the shaft 51 by a set torque smaller than the required torque.

4 Claims, 5 Drawing Sheets

U.S. PATENT DOCUMENTS

| | | | |
|---|---|---|---|
| 4,813,810 A * | 3/1989 | Suzuki | 403/322.2 |
| 4,899,611 A * | 2/1990 | Pinna | 74/492 |
| 5,114,264 A * | 5/1992 | Barlow | 403/323 |
| 5,431,379 A * | 7/1995 | Takagi | 267/273 |
| 5,628,578 A * | 5/1997 | McClanahan et al. | 403/290 |
| 5,674,024 A * | 10/1997 | Castellon | 403/321 |
| 5,816,113 A * | 10/1998 | Fohl | 74/552 |
| 5,913,634 A * | 6/1999 | Heilig | 403/374.1 |
| 5,921,147 A * | 7/1999 | Nagata et al. | 74/552 |
| 5,941,131 A * | 8/1999 | Fohl | 74/552 |
| 5,950,499 A * | 9/1999 | Hosoi et al. | 74/552 |
| 6,079,291 A * | 6/2000 | Hosoi et al. | 74/552 |
| 6,378,553 B1 * | 4/2002 | Cannet | 137/552 |
| 6,634,254 B1 * | 10/2003 | Hodac | 74/552 |
| 6,739,790 B1 * | 5/2004 | Crudele | 403/290 |
| 6,942,415 B2 * | 9/2005 | Whitton et al. | 403/27 |
| 7,066,679 B2 * | 6/2006 | Audibert et al. | 403/355 |
| 7,461,996 B2 * | 12/2008 | Kinme et al. | 403/319 |
| 7,513,709 B2 * | 4/2009 | Shimada et al. | 403/399 |
| 8,015,996 B2 * | 9/2011 | Sadil et al. | 137/625.31 |

FOREIGN PATENT DOCUMENTS

| | | |
|---|---|---|
| JP | 4-113334 | 10/1992 |
| JP | 7-186977 | 7/1995 |
| JP | 9-109903 | 4/1997 |
| JP | 3932597 | 6/2007 |
| JP | 2008-202742 | 9/2008 |

* cited by examiner

SHAFT CONNECTION STRUCTURE

TECHNICAL FIELD

This invention relates to a shaft connection structure, for example, applied to a coupling part wherein a steering gear shaft and a coupling member of a steering device for a vehicle are coupled with each other.

BACKGROUND ART

A shaft connection structure applied to a coupling part wherein a shaft and a coupling member of the steering device for the vehicle are coupled with each other is described, for example, in Unexamined Japanese Utility Model Publication No. 4-54325. In the shaft connection structure described in the above-mentioned Publication, the shaft has a tightened shaft portion (generally, serrations are formed on its outer periphery) at its tip end portion, and an annular bolt engagement groove on the axially intermediate portion of the tightened shaft portion, and the coupling member has a tightened portion formed with a shaft insertion hole (generally, serrations are formed on its inner periphery), into which the tightened shaft portion of the shaft is inserted, and a bolt insertion aperture provided to cross a part of the shaft insertion hole at the tightened portion.

Accordingly, the tightened shaft portion of the shaft and the tightened portion of the coupling member are coupled with each other such that a required torque can be transmitted therebetween by inserting the tightened shaft portion of the shaft into the shaft insertion hole of the coupling member, and inserting the bolt into the bolt insertion aperture of the coupling member and the bolt engagement groove of the shaft and tightening the bolt in the condition (the regular position condition) that the bolt engagement groove of the shaft and the bolt insertion aperture of the coupling member are axially aligned with each other.

In the shaft connection structure described in the above-mentioned Publication, a shaft portion having a diameter smaller than that of the tightened shaft portion is integrally formed on the tip end of the tightened shaft portion of the shaft to have a predetermined length enough to block the bolt insertion aperture to prevent the insertion of the bolt through the bolt insertion aperture in the condition (the non-regular position condition) that the shaft portion axially overlaps the bolt insertion aperture of the coupling member when the tightened shaft portion of the shaft is inserted into the shaft insertion hole of the coupling member. Accordingly, in the above-mentioned non-regular position condition (in detail, the condition that the shaft portion having the predetermined length integrally formed on the tip end of the shaft axially overlaps the bolt insertion aperture of the coupling member), the bolt cannot be inserted into the bolt insertion aperture, and therefore mis-assembling of the bolt (i.e. mis-assembling that the bolt is inserted into the bolt insertion aperture and is tightened thereto) can be prevented, and the shaft and the coupling member cannot be coupled with each other.

DISCLOSURE OF THE INVENTION

However, in the shaft connection structure described in the above-mentioned Publication, in the case that the bolt is inserted into the bolt insertion aperture of the coupling member and is tightened thereto by a torque larger than or equal to a specified torque in the condition that the shaft portion having the predetermined length and integrally formed on the tip end of the shaft does not axially overlap the bolt insertion aperture of the coupling member (the condition that the amount of the insertion of the shaft into the shaft insertion hole is small) even when the shaft portion is inserted into the shaft insertion hole of the coupling member, the outer periphery of the shaft portion having the predetermined length and formed in the shaft and the inner periphery of the shaft insertion hole (serrations are formed on its inner periphery) formed in the coupling member may be frictionally engaged with each other, and therefore the shaft and the coupling member may be coupled with each other such that the required torque can be transmitted therebetween.

The present invention is to solve the above-mentioned problem (to prevent the shaft and the coupling member from being coupled with each other such that the required torque can be transmitted therebetween in the non-regular position condition), and is a shaft connection structure, comprising: a shaft having a tightened shaft portion (generally, formed with serrations on its outer periphery) at its tip end portion and an annular bolt engagement groove on the axially intermediate portion of the tightened shaft portion; a coupling member having a tightened portion formed with a shaft insertion hole, (generally, serrations are formed on its inner periphery), into which the tightened shaft portion of the shaft can be inserted, and a bolt insertion aperture provided to cross a part of the shaft insertion hole at the tightened portion; and a bolt which is inserted into the bolt insertion aperture of the coupling member and is tightened thereto; wherein the tightened shaft portion of the shaft and the tightened portion of the coupling member are coupled with each other such that a required torque can be transmitted therebetween by inserting the tightened shaft portion of the shaft into the shaft insertion hole of the coupling member, and inserting the bolt into the bolt insertion aperture of the coupling member and the bolt engagement groove of the shaft and tightening the bolt in the condition (the regular position condition) that the bolt engagement groove of the shaft and the bolt insertion aperture of the coupling member are axially aligned with each other; characterized in that an insertion restriction portion having a diameter smaller than that of the tightened shaft portion is provided at the tip end of the tightened shaft portion of the shaft for restricting the insertion of the bolt through the bolt insertion aperture of the coupling member in the condition (the non-regular position condition) that the insertion restriction portion axially overlaps the bolt insertion aperture of the coupling member when the tightened shaft portion of the shaft is inserted into the shaft insertion hole of the coupling member; and the insertion restriction portion can be rotated relative to the shaft by a set torque smaller than the required torque.

In this case, the insertion restriction portion may be constituted as a member independently of the shaft, and may be coaxially assembled to the shaft by press-fitting. Further, the insertion restriction portion may be integrally formed on the shaft, and may be coaxially connected with the tip end of the tightened shaft portion via a low-strength shaft portion (for example, a small-diameter shaft portion). Further, the insertion restriction portion may be formed to have a cylindrical shape as a member independently of the shaft, and may be coaxially assembled to the shaft by a stepped bolt. Further, the insertion restriction portion may be formed to have a cylindrical shape as a member independently of the shaft, may be rotatably fit onto a support shaft portion coaxially formed in the shaft, and may be prevented from being fallen out therefrom by swaging the tip end of the support shaft portion.

In the shaft connection structure according to the present invention, the tightened shaft portion of the shaft and the tightened portion of the coupling member are coupled with each other such that the required torque can be transmitted therebetween by inserting the tightened shaft portion of the shaft into the shaft insertion hole of the coupling member, and inserting the bolt into the bolt insertion aperture of the coupling member and the bolt engagement groove of the shaft and tightening the bolt in the condition (the regular position condition) that the bolt engagement groove of the shaft and the bolt insertion aperture of the coupling member are axially aligned with each other.

In the shaft connection structure according to the present invention, the insertion restriction portion having a diameter smaller than that of the tightened shaft portion is provided at the tip end of the tightened shaft portion of the shaft for restricting the insertion of the bolt through the bolt insertion aperture of the coupling member in the condition (the non-regular position condition) that the insertion restriction portion axially overlaps the bolt insertion aperture of the coupling member when the tightened shaft portion of the shaft is inserted into the shaft insertion hole of the coupling member. Accordingly, in the above-mentioned non-regular position condition, the bolt cannot be inserted into the bolt insertion aperture, and the mis-assembling of the bolt can be prevented and the coupling of the shaft and the coupling member with each other can be prevented.

Further, in the shaft connection structure according to the present invention, in the case that the bolt is inserted into the bolt insertion aperture of the coupling member and is tightened by a torque larger than or equal to a specified torque in the condition that the insertion restriction portion provided at the tip end of the shaft does not axially overlap the bolt insertion aperture of the coupling member (the condition that the amount of the insertion of the shaft into the shaft insertion hole is small) even when the insertion restriction portion is inserted into the shaft insertion hole of the coupling member, the outer periphery of the insertion restriction portion provided at the shaft and the inner periphery of the shaft insertion hole (generally, serrations are formed on its inner periphery) formed in the coupling member are frictionally engaged with each other, and therefore the insertion restriction portion provided at the shaft and the coupling member may be coupled with each other (mis-coupling) such that the required torque can be transmitted therebetween.

However, in the shaft connection structure according to the present invention, the insertion restriction portion can be rotated relative to the shaft by the set torque smaller than the required torque, and therefore when the above-mentioned mis-coupling occurs, even when the insertion restriction portion provided at the shaft and the coupling member are coupled with each other such that the required torque can be transmitted therebetween, the insertion restriction portion is rotated relative to the shaft by the set torque smaller than the required torque. Accordingly, the above-mentioned mis-coupling can be detected on the basis of the relative rotation (for example, the offset of the steering neutral position in the steering device) between the shaft and the coupling member along with the rotation of the insertion restriction portion relative to the shaft.

When the above-explained invention is embodied, in the case that the insertion restriction portion is constituted as a member independently of the shaft, and is coaxially assembled to the shaft by the press-fitting, the set torque can be adjusted by the amount of the press-fitting, and the present invention can be simply inexpensively embodied. Further, in the case that the insertion restriction portion is integrally formed on the shaft, and is coaxially connected with the tip end of the tightened shaft portion via the low-strength shaft portion, the number of the parts and the steps of the assembling is not increased, and therefore the present invention can be inexpensively embodied.

MODE FOR CARRYING OUT THE INVENTION

Figure 1:
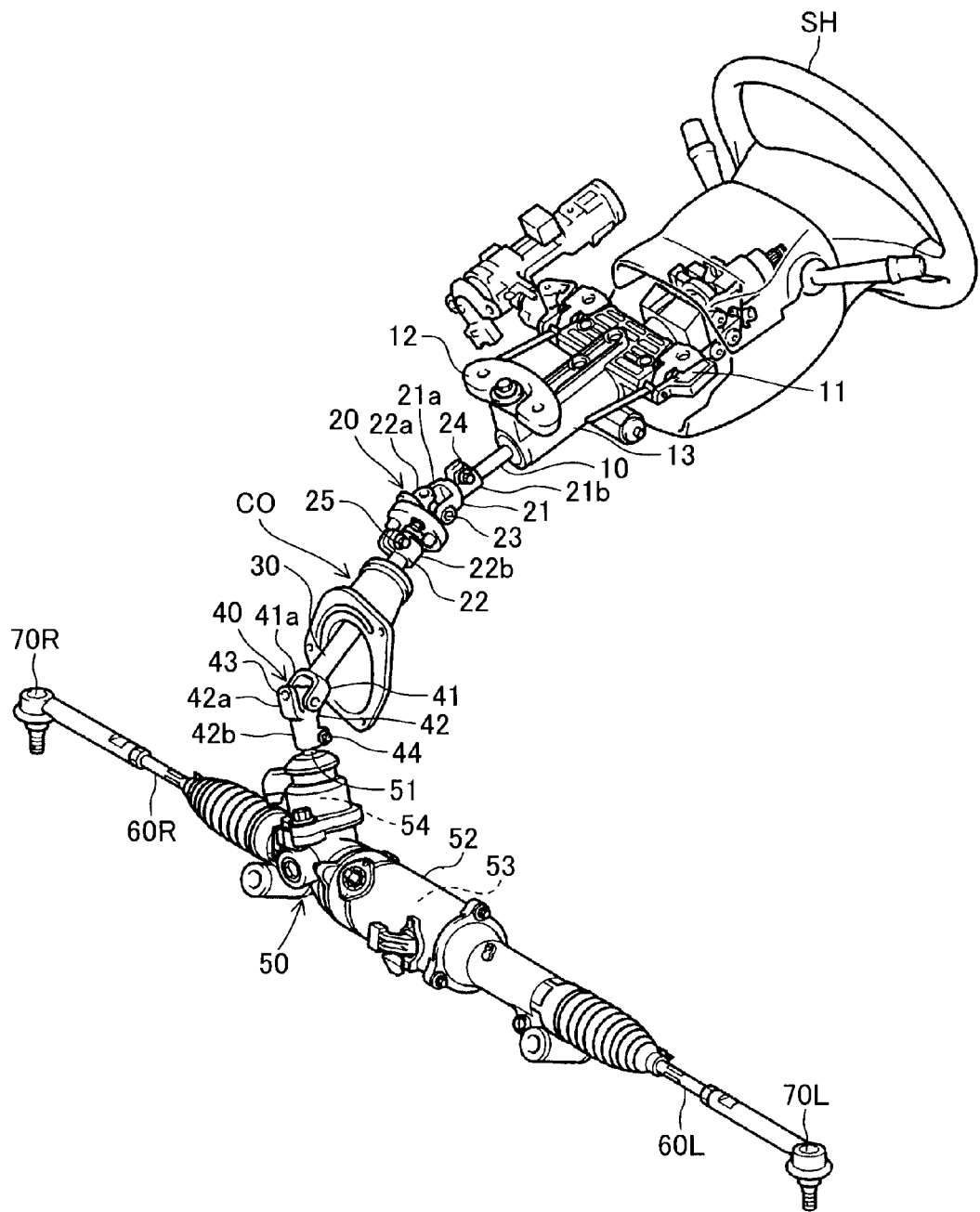
FIG. 1 is an entire configuration view generally showing the first embodiment that the shaft connection structure according to the invention is applied to a steering device for a vehicle.

Below, each embodiment according to the invention will be explained by referring to the drawings. FIGS. 1-5 show the first embodiment that the shaft connection structure according to the invention is applied to a coupling part wherein a lower joint yoke 42 of a lower universal joint 40 and a pinion shaft 51 of a steering gear unit 50 of a steering device for a vehicle provided with a rack-assist electric power steering mechanism are coupled with each other. In this first embodiment, as shown in FIG. 1, a steering wheel SH which can be turned by a driver is coupled with the pinion shaft 51 of the steering gear unit 50 via a transmission shaft CO such that a torque can be transmitted therebetween.

The transmission shaft CO transmits the steering wheel torque input by the driver to the pinion shaft 51 of the steering gear unit 50, and has a steering main shaft 10, an upper universal joint 20 for coupling the steering main shaft 10 and an intermediate shaft 30 with each other, and a lower universal joint 40 for coupling the intermediate shaft 30 and the pinion shaft 51 of the steering gear unit 50.

The steering main shaft 10 is rotatably supported in a column tube 13 assembled to a vehicle body (not shown) via a break-away bracket 11 and a lower bracket 12. Further, the steering main shaft 10 integrally rotatably supports the steering wheel SH at its upper end portion.

The upper universal joint 20 has an upper joint yoke 21, a lower joint yoke 22 provided with a rubber coupling, and a cross spider 23. The upper and lower joint yokes 21 and 22 have forked yoke portions 21a and 22a, respectively, and are swingly coupled with each other at the yoke portions 21a and 22a via the cross spider 23 such that a torque can be transmitted therebetween. It should be noted that the upper joint yoke 21 is coupled with the steering main shaft 10 such that a torque can be transmitted therebetween by inserting the lower end portion of the steering main shaft 10 into an insertion hole (not shown) of a tightened portion 21b of the upper joint yoke and inserting a bolt 24 into a bolt insertion aperture (not shown) of the tightened portion 21b of the upper joint yoke 21 and tightening the bolt 24.

The intermediate shaft 30 is coupled with the lower joint yoke 22 such that a torque can be transmitted therebetween by inserting the upper end of the intermediate shaft 30 into an insertion hole (not shown) provided in a tightened portion 22b of the lower joint yoke 22 of the upper universal joint 20 and inserting a bolt 25 into a bolt insertion aperture (now shown) of the tightened portion 22b of the lower joint yoke 22 and tightening the bolt 25. Further, an upper joint yoke 41 of the lower universal joint 40 is integrally secured to the lower end of the intermediate shaft 30.

The lower universal joint 40 has an upper joint yoke 41, a lower joint yoke 42 (the coupling member of the invention), and a cross spider 43. The upper and lower joint yokes 41 and 42 have forked yoke portions 41a and 42a, respectively, and are swingly coupled with each other at the yoke portions 41a and 42a via the cross spider 43 such that a torque can be transmitted therebetween.

The steering gear unit 50 has the pinion shaft 51 integrally rotatably coupled with the lower joint yoke 42 of the lower universal joint 40, a rack bar (not shown) which can stroke in the right and left direction in the vehicle along with the rotation of the pinion shaft 51, a rack housing 52 for rotatably supporting the pinion shaft 51 and supporting the rack bar so as to be able to stroke, and a known EPS actuator 53 housed in the rack housing 52 for applying an assist torque (assist force) to the rack bar. The pinion shaft 51 projects from the rack housing 52 by a predetermined amount, and is coupled with the lower joint yoke 42 of the lower universal joint 40 at the projecting end portion thereof such that a required torque can be transmitted therebetween. It should be noted that the required torque is a torque required for the steering in this device.

The rack bar (not shown) is coupled with a pair of right and left tie rods 60L and 60R via ball joints (not shown) at its right and left end portions, respectively. The tie rods 60L and 60R are coupled with steering knuckles (not shown) pivoting right and left front wheels (not shown) via ball joints 70L and 70R, respectively. Accordingly, when the pinion shaft 51 rotates, the rack bar strokes in the right and left direction in the vehicle and the right and left front wheels are steered.

The EPS actuator 53 is coaxially provided relative to the rack bar, and has an electric motor (not shown) assembled in the rack housing 52 and a ball screw mechanism (not shown) to reduce the rotation of the electric motor and convert it to the stroke of the rack bar, and the rotation of the electric motor is controlled by an electric control unit (not shown) depending on the steering wheel torque detected by a torque sensor provided on the intermediate portion of the pinion shaft 51.

Figure 2:
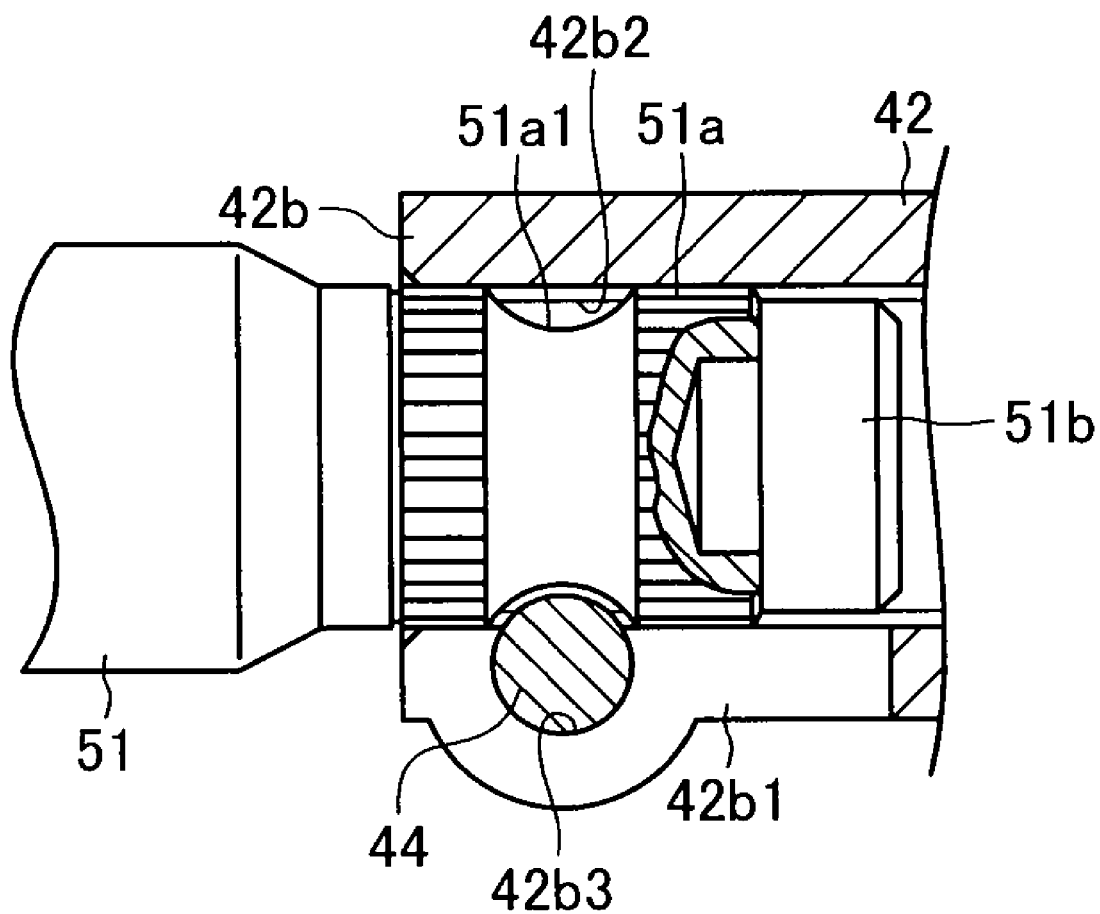
FIG. 2 is an enlarged side view showing the coupling part wherein the coupling member and the pinion shaft shown in FIG. 1 are coupled with each other in the partially-broken manner.
Figure 3:
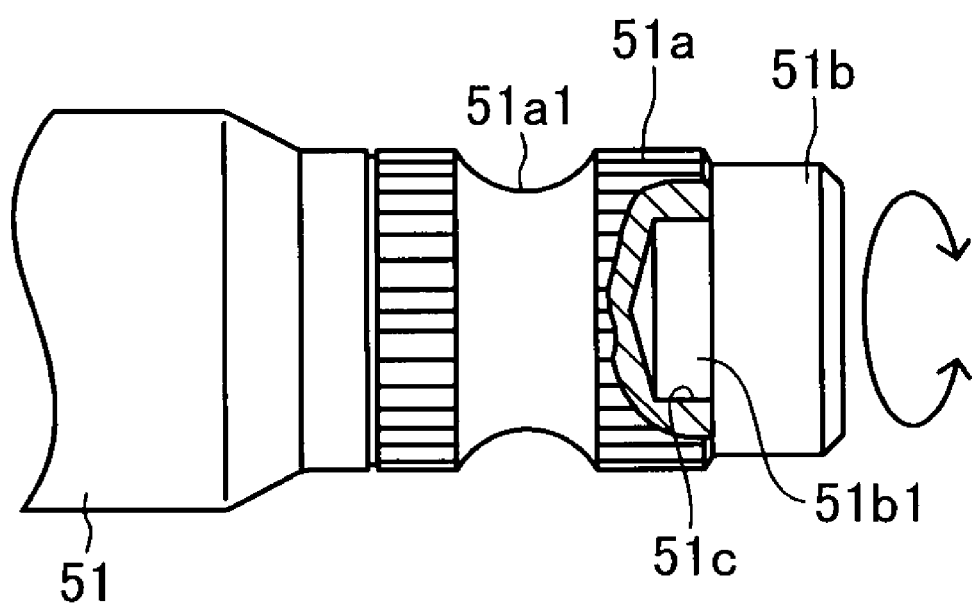
FIG. 3 is a side view showing the pinion shaft shown in FIG. 2 in the partially-broken manner.

In the first embodiment, a tightened shaft portion 51a having a predetermined length (serrations are formed on its outer periphery) is formed at the tip end portion (the right side end portion in FIG. 2) of the pinion shaft 51, and an annular bolt engagement groove 51a1 is formed on the axially intermediate portion of the tightened shaft portion 51a. Further, an insertion restriction shaft 51b is provided at the tip end of the pinion shaft 51. As shown in FIGS. 2 and 3, the insertion restriction shaft 51b is constituted as a member independently of the pinion shaft 51, and has a diameter smaller than that of the tightened shaft portion 51a. Further, as shown in FIG. 3, the insertion restriction shaft 51b at its mounting shaft portion 51b1 is coaxially assembled to a mounting hole 51c provided in the tip end of the pinion shaft 51 by press-fitting, and can be rotated relative to the pinion shaft 51 by a set torque smaller than the above-mentioned required torque.

On the other hand, as shown in FIGS. 1 and 2, the lower joint yoke 42 of the lower universal joint 40 has the above-mentioned yoke portion 42a and a tightened portion 42b coupled with the tip end portion of the pinion shaft 51. The tightened portion 42b has a radially extending slit 42b1 at its one end (the lower side in FIG. 2), and has a shaft insertion hole 42b2 (serrations are formed on its inner periphery), into which the tightened shaft portion 51a of the pinion shaft 51 can be inserted, and a bolt insertion aperture 42b3 provided to cross a part of the shaft insertion hole 42b2.

According to the above-explained constitution, in this first embodiment, the tightened shaft portion 51a of the pinion shaft 51 and the tightened portion 42b of the lower joint yoke 42 are coupled with each other such that the required torque can be transmitted therebetween by inserting the tightened shaft portion 51a of the pinion shaft 51 into the shaft insertion hole 42b2 of the lower joint yoke 42, and inserting the bolt 44 (refer to FIG. 1) into the bolt insertion aperture 42b3 of the lower joint yoke 42 and the bolt engagement groove 51a1 of the pinion shaft 51 and tightening the bolt 44 in the condition (the regular position condition shown in FIG. 2) that the bolt engagement groove 51a1 of the pinion shaft 51 and the bolt insertion aperture 42b3 of the lower joint yoke 42 are axially aligned with each other.

Figure 4:
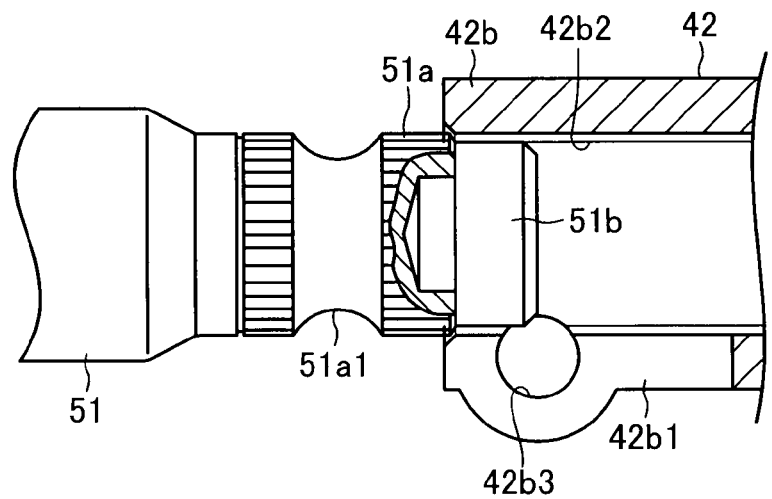
FIG. 4 is a view explaining an operation in the first embodiment in the condition that the tightened shaft portion of the pinion shaft is not inserted into the shaft insertion hole of the coupling member (non-serration-fit condition) and the insertion restriction portion provided at the pinion shaft axially overlaps the bolt insertion aperture of the coupling member (when the mis-assembling is prevented).

Further, in this first embodiment, as shown in FIG. 4, when the tightened shaft portion 51a of the pinion shaft 51 is inserted into the shaft insertion hole 42b2 of the lower joint yoke 42, in the condition (the non-regular position condition) that the insertion restriction shaft 51b axially overlaps the bolt insertion aperture 42b3 of the lower joint yoke 42, it is constituted that the insertion of the bolt 44 through the bolt insertion aperture 42b3 of the lower joint yoke 42 is restricted.

In the shaft connection structure of the first embodiment constituted as explained above, the insertion restriction shaft 51b having a diameter smaller than that of the tightened shaft portion 51a is provided at the tip end of the tightened shaft portion 51a of the pinion shaft 51 for restricting the insertion of the bolt 44 through the bolt insertion aperture 42b3 of the lower joint yoke 42 in the condition (the non-regular position condition shown in FIG. 4) that the insertion restriction shaft 51b axially overlaps the bolt insertion aperture 42b3 of the lower joint yoke 42 when the tightened shaft portion 51a of the pinion shaft 51 is inserted into the shaft insertion hole 42b2 of the lower joint yoke 42. Accordingly, in the above-mentioned non-regular position condition, the bolt 44 cannot be inserted through the bolt insertion aperture 42b3, and therefore the mis-assembling of the bolt 44 (the mis-assembling that the bolt 44 is inserted through the bolt insertion aperture 42b3 and is tightened) can be prevented, and the coupling of the pinion shaft 51 and the lower joint yoke 42 with each other can be prevented.

Figure 5:
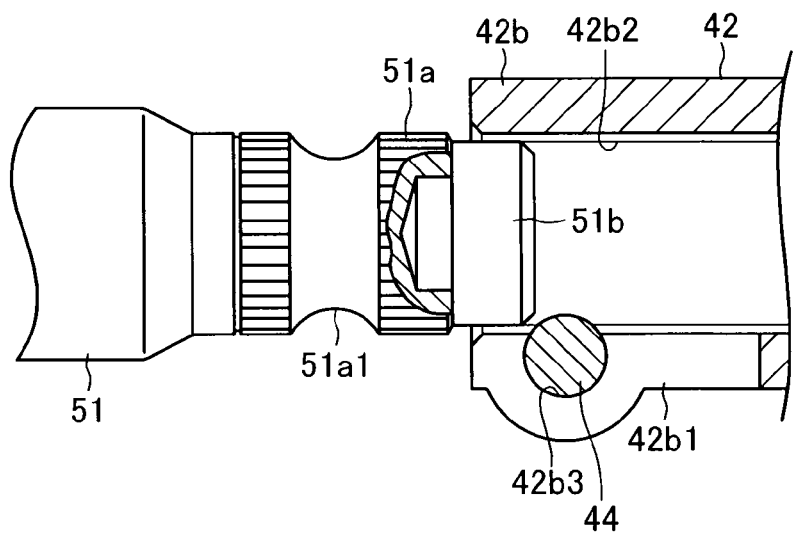
FIG. 5 is a view explaining an operation in the first embodiment in the condition that the tightened shaft portion of the pinion shaft is not inserted into the shaft insertion hole of the coupling member (non-serration-fit condition), the insertion restriction portion provided at the pinion shaft does not axially overlap the bolt insertion aperture of the coupling member, and the bolt is inserted into the bolt insertion aperture and is tightened thereto (when the mis-coupling occurs).

Further, in the shaft connection structure of this first embodiment, as shown in FIG. 5 in the case that the bolt 44 is inserted into the bolt insertion aperture 42b3 of the lower joint yoke 42 and is tightened by a torque larger than or equal to the specified torque in the condition that the insertion restriction shaft 51b provided at the tip end of the pinion shaft 51 does not axially overlap the bolt insertion aperture 42b3 of the lower joint yoke 42 even when the insertion restriction shaft 51b is inserted into the shaft insertion hole 42b2 of the lower joint yoke 42, the outer periphery of the insertion restriction shaft 51b provided at the pinion shaft 51 and the inner periphery of the shaft insertion hole 42b2 (serrations are formed on its inner periphery) formed in the lower joint yoke 42 are frictionally engaged with each other, and therefore the insertion restriction shaft 51b provided at the pinion shaft 51 and the lower joint yoke 42 may be coupled with each other (mis-coupling) such that the required torque can be transmitted therebetween.

However, in this first embodiment, the insertion restriction shaft 51b can be rotated relative to the pinion shaft 51 by the set torque smaller than the required torque, and therefore when the above-mentioned mis-coupling occurs, even when the insertion restriction shaft 51b provided at the pinion shaft 51 and the lower joint yoke 42 are coupled with each other such that the required torque can be transmitted therebetween, the insertion restriction shaft 51b can be rotated relative to the pinion shaft 51 by the set torque smaller than the required torque. Accordingly, the above-mentioned mis-coupling can be detected on the basis of the relative rotation (for example, the offset of the steering neutral position in the steering device) between the pinion shaft 51 and the lower joint yoke 42 along with the rotation of the insertion restriction shaft 51b relative to the pinion shaft 51.

Further, in this first embodiment, the insertion restriction shaft 51b is constituted as a member independently of the pinion shaft 51, and is coaxially assembled to the pinion shaft 51 by press-fitting, and therefore the above-mentioned set torque can be adjusted by the press-fitting amount (the difference in the diameter between the mounting hole 51c provided in the pinion shaft 51 and the mounting shaft portion 51b1 of the insertion restriction shaft 51b), and the first embodiment can be simply inexpensively embodied.

It should be noted that this first embodiment is one which the present invention applies to the coupling part (a part which an assist torque is not applied to) wherein the lower joint yoke 42 of the lower universal joint 40 and the pinion shaft 51 of the steering gear unit 50 of the steering device for the vehicle provided with a rack-assist electric power steering mechanism. An assist torque is applied to the similar coupling part in the steering device for the vehicle provided with the column-assist electric power steering, and therefore in the case that the prior art applies to the coupling part, the above-mentioned mis-coupling can be easily detected.

Accordingly, the enhancement of the detection of the mis-coupling in the case that the present invention in place of the prior art applies to the above-mentioned coupling part in the steering device for the vehicle provided with the rack-assist electric power steering mechanism can be increased, compared with the enhancement of the detection of the mis-coupling in the case that the present invention in place of the prior art applies to the similar coupling part (the part which the assist torque is applied to) in the steering device for the vehicle provided with the column-assist electric power steering mechanism. Accordingly, the present invention is preferable for the coupling part (the part which the assist torque is not applied to) in the steering device for the vehicle provided with the rack-assist electric power steering mechanism.

Figure 6:
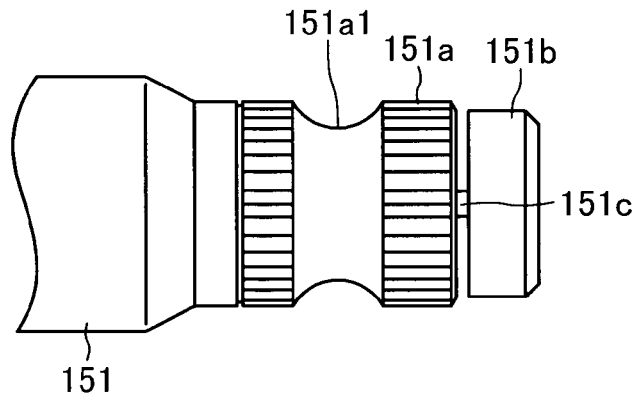
FIG. 6 is a side view showing the second embodiment of the shaft connection structure according to the invention, corresponding to FIG. 3.
Figure 7:
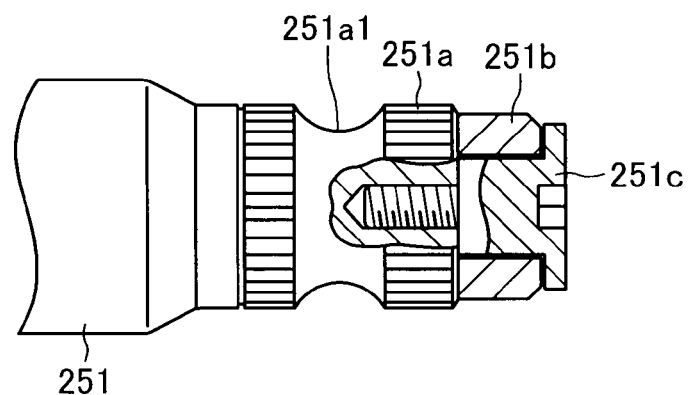
FIG. 7 is a side view showing the third embodiment of the shaft connection structure according to the invention, corresponding to FIG. 3.
Figure 8:
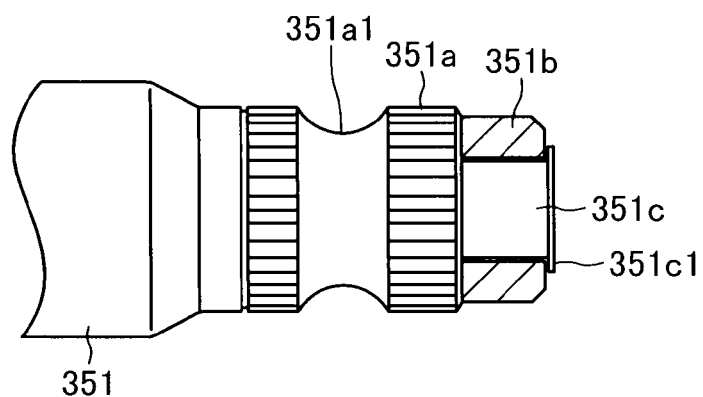
FIG. 8 is a side view showing the fourth embodiment of the shaft connection structure according to the invention, corresponding to FIG. 3.

In the above-explained first embodiment, the present invention is embodied by employing the constitution shown in FIG. 3, however, the present invention can be embodied, for example, by employing the constitution of the second embodiment shown in FIG. 6, or the third embodiment shown in FIG. 7, or the fourth embodiment shown in FIG. 8.

In the second embodiment shown in FIG. 6, in place of the insertion restriction shaft 51b of the above-explained first embodiment, an insertion restriction portion 151b is employed. The insertion restriction portion 151b is integrally formed on a pinion shaft 151, is coaxially connected with the tip end of a tightened shaft portion 151a of the pinion shaft 151 via a low-strength shaft portion (small-diameter shaft portion) 151c, and can be rotated relative to the pinion shaft 151 by a set torque smaller than the above-mentioned required torque. The tightened shaft portion 151a is substantially the same as the tightened shaft portion 51a of the above-explained first embodiment, and is formed with a bolt engagement groove 151a1 on its axially intermediate portion as in the above-explained first embodiment.

In this second embodiment, as in the above-explained first embodiment, the above-mentioned mis-assembling can be prevented, and the above-mentioned mis-coupling can be detected. Further, the insertion restriction portion 151b is integrally formed on the pinion shaft 151, and is coaxially connected with the tip end of the tightened shaft portion 151a via the low-strength shaft portion 151c, and therefore the increase of the number of the parts and the steps of the assembling does not occur, and the second embodiment can be inexpensively embodied.

In the third embodiment shown in FIG. 7, an insertion restriction shaft 251b is employed in place of the insertion restriction shaft 51b of the above-explained first embodiment. The insertion restriction shaft 251b is formed to have a cylindrical shape as a member independently of a pinion shaft 251, is coaxially assembled to a tightened shaft portion 251a of the pinion shaft 251 by using a stepped bolt 251c having a hexagonal aperture at the center portion of its head, and can be rotated relative to the pinion shaft 251 by a set torque smaller than the above-mentioned required torque. The tightened shaft portion 251a is substantially the same as the tightened shaft portion 51a of the above-explained first embodiment, and is formed with a bolt engagement groove 251a1 on its axially intermediate portion as in the above-explained first embodiment. In this third embodiment, as in the above-explained first embodiment, the above-mentioned mis-assembling can be prevented and the above-mentioned mis-coupling can be detected.

In the fourth embodiment shown in FIG. 8, an insertion restriction shaft 351b is employed in place of the insertion restriction shaft 51b of the above-explained first embodiment. The insertion restriction shaft 351b is formed to have a cylindrical shape as a member independently of a pinion shaft 351, and is rotatably fit onto a support shaft portion 351c coaxially formed on a tightened shaft portion 351a of the pinion shaft 351. Fall-out of the insertion restriction shaft 351b is prevented by a flange portion 351c1 formed by swaging the tip end of the support shaft portion 351c, and can be rotated relative to the pinion shaft 351 by a set torque smaller than the above-mentioned required torque. The tightened shaft portion 351a is substantially the same as the tightened shaft portion 51a of the above-explained first embodiment, and is formed with a bolt engagement groove 351a1 on its axially intermediate portion as in the above-explained first embodiment. In this fourth embodiment, as in the first embodiment, the above-mentioned mis-assembling can be prevented, and the above-mentioned mis-coupling can be detected.

In each of the above-explained embodiments, in the steering device for the vehicle, the shaft connection structure according to the present invention is applied to the coupling part wherein the lower joint yoke 42 of the lower universal joint 40 and the pinion shaft 51 are coupled with each other, however, the shaft connection structure according to the present invention can be applied to the other similar coupling part in the steering device for the vehicle.

Further, in each of the above-explained embodiments, the shaft connection structure according to the present invention is applied to the coupling part on the steering wheel side (the input side) of the rack bar of the steering device for the vehicle provided with the rack-assist electric power steering mechanism, however, the shaft connection structure according to the present invention can be applied to any coupling parts in the other steering device for the vehicle, for example, the coupling part on the steering wheel side (the input side) of the rack bar in the steering device for the vehicle provided with the rack-assist hydraulic power steering mechanism, or the coupling part on the steering wheel side (the input side) of the pinion shaft in the steering device for the vehicle provided with the pinion-assist electric power steering mechanism, or the coupling part on the wheel side (the output side) of the steering shaft in the steering device for the vehicle provided with the column-assist electric power steering mechanism.

Further, the shaft connection structure according to the present invention can be applied to the similar coupling parts in the various devices other than the steering device for the vehicle as in the above-explained embodiments or along with suitable modification.

The invention claimed is:

1. A shaft connection structure, comprising:
a shaft including a tightened shaft portion at a tip end portion of the shaft and an annular bolt engagement groove on an axially intermediate portion of the tightened shaft portion;
an insertion restriction portion provided at a tip end of the tightened shaft portion and rotatably connected thereto, said insertion restriction portion including an outer diameter smaller than that of the tightened shaft portion, and a central rotation axis of said insertion restriction portion is coaxial with a central axis of said shaft;
a coupling member including a tightened portion formed with a shaft insertion hole into which the tightened shaft portion of the shaft is insertable, and a transverse bolt insertion aperture crossing a part of the shaft insertion hole at the tightened portion; and
a bolt which is insertable into the bolt insertion aperture of the coupling member, and said bolt is tightened upon insertion into the bolt insertion aperture;
wherein in a fully inserted condition, the tightened shaft portion is axially aligned with and fully inserted into the shaft insertion hole such that the bolt engagement groove and the bolt insertion aperture are axially aligned and the bolt is inserted therebetween, whereby a required torque is transmitted between said shaft and said coupling member and
wherein in a partially inserted condition, the tightened shaft portion is axially aligned with and partially inserted into the shaft insertion hole such that a part of the insertion restriction portion is within a cross section of the bolt insertion aperture, whereby the insertion restriction portion restricts insertion of the bolt and the insertion restriction portion is rotatable relative to the shaft by a set torque smaller than the required torque, such that torques greater than said set torque are not transmitted from said shaft to said coupling member.

2. The shaft connection structure as set forth in claim 1, wherein the insertion restriction portion is a member that is independent of the shaft, and is coaxially assembled to the shaft by press-fitting.

3. The shaft connection structure as set forth in claim 1, wherein the tightened shaft portion of the shaft includes serrations formed on an outer periphery of the tightened shaft portion, and the tightened portion of the coupling member includes serrations formed on an inner periphery of the shaft insertion hole.

4. The shaft connection structure as set forth in claim 1, wherein an outer periphery of the insertion restriction portion and an inner periphery of the shaft insertion hole frictionally engage with each other when the bolt is inserted into the bolt insertion aperture and is tightened by a torque equal to or greater than a specified torque, in a condition in which no part of the insertion restriction portion is within the cross section of the bolt insertion aperture.

* * * * *